United States Patent Office 3,463,008
Patented Aug. 26, 1969

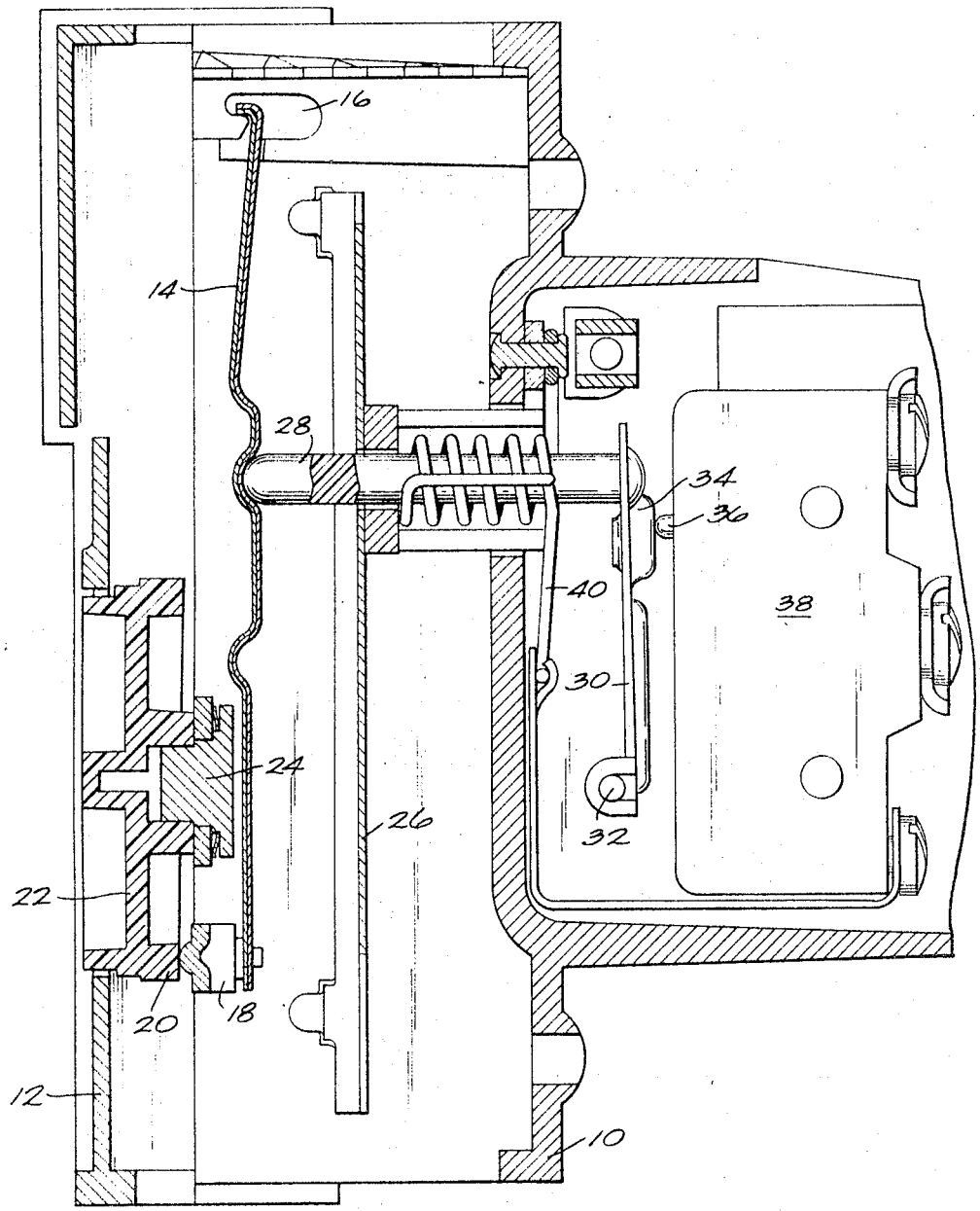

3,463,008
THERMOSTAT WITH ANTICIPATOR REMOTE
FROM AMBIENT TEMPERATURE SENSOR
Allen L. Teichert, Menomonee Falls, and George F.
Schrader, Milwaukee, Wis., assignors to Controls Company of America, Melrose Park, Ill., a corporation of Delaware
Filed Feb. 7, 1968, Ser. No. 703,643
Int. Cl. G01k 5/62
U.S. Cl. 73—363.5
5 Claims

ABSTRACT OF THE DISCLOSURE

The amibent temperature sensing bimetal operates the switch through a rod which is heated during the "on" cycle by the anticipator heater. This causes the pin to expand in a direction aiding the bimetal to actuate the switch to "off." Expansion rate is is selected to give desired anticipation and the heater is positioned remote from the bimetal to reduce heater influence on the bimetal. This reduces thermostat droop during long "on" cycles characteristic of high heat load conditions.

BACKGROUND OF INVENTION

The force required to operate the switch in a line voltage thermostat occasions a temperature differential in the thermostat between the "on" and the "off" cycles. To narrow this differential an anticipator is used adjacent the temperature sensor to create a false ambient temperature during the heat "on" cycle. Satisfactory operation is reached with a given heat loss from the heated space but as the heat loss increases the heat supplied by the anticipator will cause the thermostat to control at a lower temperature, which can be quite appreciable. Thus at the time the heat load is greatest, that is, on a very cold day, the thermostat tends to regulate the room temperature at a lower temperature than desired. This decrease is called droop and is undesirable. Without the anticipator in the thermostat the differential between "on" and "off" is too great for satisfactory control and this, therefore, is not a proper solution. Thermostat droop has long been a problem in the art and has been considered inherent in anticipated thermostats.

SUMMARY OF INVENTION

The present invention greatly reduces droop by separating the room temperature sensing element and the anticipator function. Two goals are achieved by this approach. First of all, the anticipator heater is removed from the ambient temperature sensor and thus the sensor can be more responsive to the temperature sought to be sensed. Secondly, the element heated by the anticipator heater can now be made of lesser mass and require less heat to accomplish the desired function and, hence, there is less heat in the environment of the thermostat to influence the temperature sensor.

DESCRIPTION OF DRAWING

The single figure of the drawing is a vertical section through a thermostat according to the present invention.

DESCRIPTION OF PREFERRED EMBODIMENT

The illustrated thermostat is of the line voltage type used in connection with electric heating and the like. Since such thermostats are required to handle high voltage and high current the switch employed in conjunction with the thermostat necessarily gets into substantial operating forces which, in turn, require a relatively massive bimetal for development of the forces.

The thermostat is mounted on a base 10 having a cover 12 which is apertured to allow ample air flow over the bimetal (to facilitate sensing ambient conditions) and over the anticipator heater. The bimetal 14 has one end mounted on the base at 16 and has its other end provided with a cam follower 18 riding on the peripheral cam 20 on the back side of the adjusting knob 22 rotatably mounted on post 24. It will be understood that the knob 22 is rotated to rotate cam 20 and affect the position of the free end of the bimetal 14 and, hence, the temperature setting of the thermostat.

The thermostat housing is provided with a plate 26 which serves as a thermal barrier and as a guide for pin 28. The left end of pin 28 seats in the depression formed in the bimetal and the right end of the pin seats in the depression formed in lever 30 pivoted on pin 32. Lever 30 is also provided with a pad 34 which acts against the actuating plunger 36 of the switch 38.

Resistive heater wire 40 is wrapped around pin 28 to heat the pin when the thermostat is in the "on" cycle. The pin itself is "Kynar" which is a thermoplastic material having an expansion rate which is quite satisfactory for the present use. In the illustrated embodiment the rod is capable of .005 inch expansion but due to the resilience of the bimetal all of this does not work against the switch 38 which, in keeping with the type of switching requirement present here, has a .001 inch differential. Part of the pin expansion appears as deflection of the bimetal overcoming the 2½ to 6 ounce differential in switch actuating force.

Bimetal 14 will bow towards the switch as it is heated. The expansion of pin 28 will have the same net effect, that is, will increase in length and aid the bimetal in actuating the switch to "off".

As the ambient temperature falls the bimetal cools and bows away from the switch and ultimately will close the switch 38. The space heating unit controlled by the thermostat will then start supplying heat to the environment and heater 40 will begin heating pin 28. The bimetal will still be cooling and moving away from the switch and the expanding pin will not under these conditions open the switch. When the ambient temperature around the bimetal approaches the desired level the bimetal starts bowing back towards the switch 38 and since the pin has picked up some movement by reason of being heated the thermostat is practically ready to open the switch. It takes very little movement of the bimetal then to actuate the switch plunger 36 to open the switch. This, then, shuts off the heat supply to the environment and de-energizes heater 40. The pin now cools and shortens and the bimetal will ultimately start cooling and bowing to the left starting the cycle over again. Since the mass of the pin is small it will cool relatively rapidly to retain control in the bmietal.

With the old style anticipation but otherwise comparable to the present type of thermostat the time to cycle the switch by the anticipator alone in a controlled lab test was approximately 26 minutes of heating and cooling for one cycle. A similar test with the new design resulted in reduction of this time to ten minutes. The old design thermostat had an 8.5° F. rise in bimetal temperature at 10% duty cycle and a 46° F. rise at 80% duty cycle. These temperature rises above room ambient reflect in droop of the controlled environment temperature although the droop is not of the same magnitude. With the new anticipator the resulting rise in bimetal temperatures are only 4° F. at 10% duty and 10° F. at 80% duty. It will be seen, therefore, that the present design renders the thermostat far more sensitive to ambient temperature and is far less influenced by the heat input to the anticipator. The important features of the anticipator are the remote location of the anticipator heater and using a secondary sensor (the pin in this case) as the anticipated element rather than directly anticipating the bimetal.

The principle is not limited to an expandable pin but is applicable to any configuration ultilizing deformation or expansion coupled with low energy requirements and located remote from the prime sensor. In connection with the pin design even more efficient use of the heater can be had by mounting the heater inside a hollow pin. This has not been shown since the illustrated embodiment lends itself to more ready comprehension. The concept is applicable to motor devices other than bimetals or expanding pins—as, for example, thermal bellows and the like.

We claim:

1. In a thermostat including an ambient temperature responsive motor device operatively connected to a switch for operation of the switch between "on" and "off" in accordance with ambient temperature, the improvement comprising
an anticipator operatively associated with the motor device to reduce the temperature induced movement required of the motor device to actuate the switch, said anticipator including a second temperature responsive motor device and a heater therefor.

2. A thermostat according to claim 1 in which the heater is remote from the first motor device and controlled by the switch, the anticipator acting on the first motor device.

3. A thermostat according to claim 2 in which the first motor device is a bimetal.

4. A thermostat according to claim 3 in which the second motor device is an expandable member acting between the bimetal to the switch with the heater in close heat transfer relationship to the expandable device.

5. A thermostat according to claim 4 in which the expandable member is in the form of a pin passing through a heat barrier and the heater is positioned on the side of the barrier remote from the bimetal.

References Cited

UNITED STATES PATENTS

| | | | |
|---|---|---|---|
| 2,040,217 | 5/1936 | Smulski | 73—363.5 |
| 2,181,606 | 11/1939 | Parks | 236—68 |
| 2,263,574 | 11/1941 | Gille | 236—68 |
| 2,366,387 | 2/1945 | Crise | 236—68 |

LOUIS R. PRINCE, Primary Examiner

WILLIAM A. HENRY II, Assistant Examiner